United States Patent [19]

Gerst et al.

[11] Patent Number: 5,016,346

[45] Date of Patent: May 21, 1991

[54] APPARATUS FOR APPLYING A BUNG SEAL TO AN ELECTRICAL LEAD

[75] Inventors: Michael Gerst, Worms; Wolfgang Schröder, Eltville; Lothar Bauer, Wiesbaden-Norderstadt, all of Fed. Rep. of Germany

[73] Assignee: AMP Incorporated, Harrisburg, Pa.

[21] Appl. No.: 556,061

[22] Filed: Jul. 20, 1990

[30] Foreign Application Priority Data

Jul. 27, 1989 [GB] United Kingdom ................. 8917145

[51] Int. Cl.⁵ .......................................... B23P 19/00

[52] U.S. Cl. .................................. 29/754; 29/235; 29/450; 29/717; 29/809

[58] Field of Search ................ 29/450, 451, 464, 717, 29/809, 235, 281.1, 754, 785, 792

[56] References Cited

U.S. PATENT DOCUMENTS

| | | | |
|---|---|---|---|
| 2,683,924 | 7/1954 | Schryver | 29/754 |
| 3,605,239 | 9/1971 | Eschholz | 29/717 |
| 3,665,578 | 5/1972 | Jaquette | 29/717 |
| 4,653,182 | 3/1987 | Fukuda et al. | 29/450 |
| 4,765,052 | 8/1988 | Fukuda et al. | 29/450 |
| 4,832,555 | 5/1989 | Gordon | 29/235 |

FOREIGN PATENT DOCUMENTS 154783 9/1984 Japan .

*Primary Examiner*—P. W. Echols
*Assistant Examiner*—David P. Bryant
*Attorney, Agent, or Firm*—Bruce J. Wolstoncroft; Thomas G. Terrell

[57] ABSTRACT

A leading bung seal (BS1) in a magazine (4) is picked up by a bung seal transfer clamp (8) and is positioned between a bung seal receptacle (6) and a bung seal transfer device (10), which are axially aligned. A bung seal expansion pin (18) is advanced to drive the leading bung seal (BS1) into the bung seal receptacle (6), to force it against a resilient grommet (42) therein, and to extend through the bung seal (BS1) so as to expand it. A bung seal expansion sleeve (14) surrounding the expansion pin (18) is then advanced further to expand the bung seal (BS1) and the pin (18) is withdrawn leaving the bung seal (BS1) secured to the expansion sleeve (14) by its own resilience. A lead (L) is then inserted into the expansion sleeve (14), and the expansion sleeve (14) is then withdrawn, leaving the seal (BS1) secured to the lead (L), by its own resilience, after which the bung seal receptacle (6) is opened and the lead (L) with the bung seal (BS1) thereon is removed to a station at which an electrical terminal is crimped to the lead (L) and to the bung seal (BS1).

9 Claims, 12 Drawing Sheets

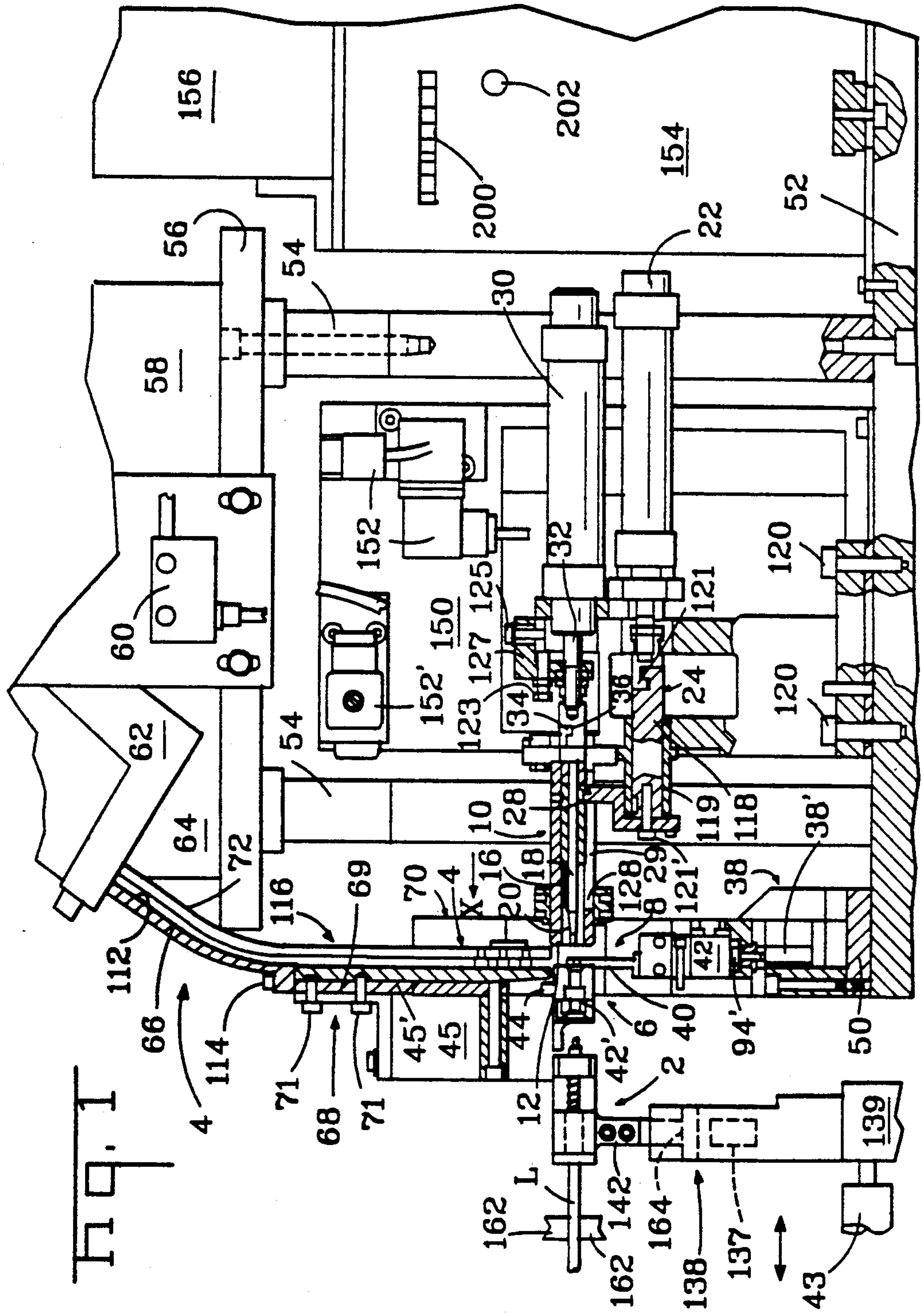
156
154
202
200
52
56
54
58
30
22
152
60
62
64
72
150
125
127
123
152'
32
34
36
121
120
24
118
119
10
28
16
18
20
X
4
70
69
116
112
66
114
71
68
45'
45
44
12
42'
6
40
2
94'
50
38
38'
121'
128
29
8
42
139
142
164
138
137
43
L
162

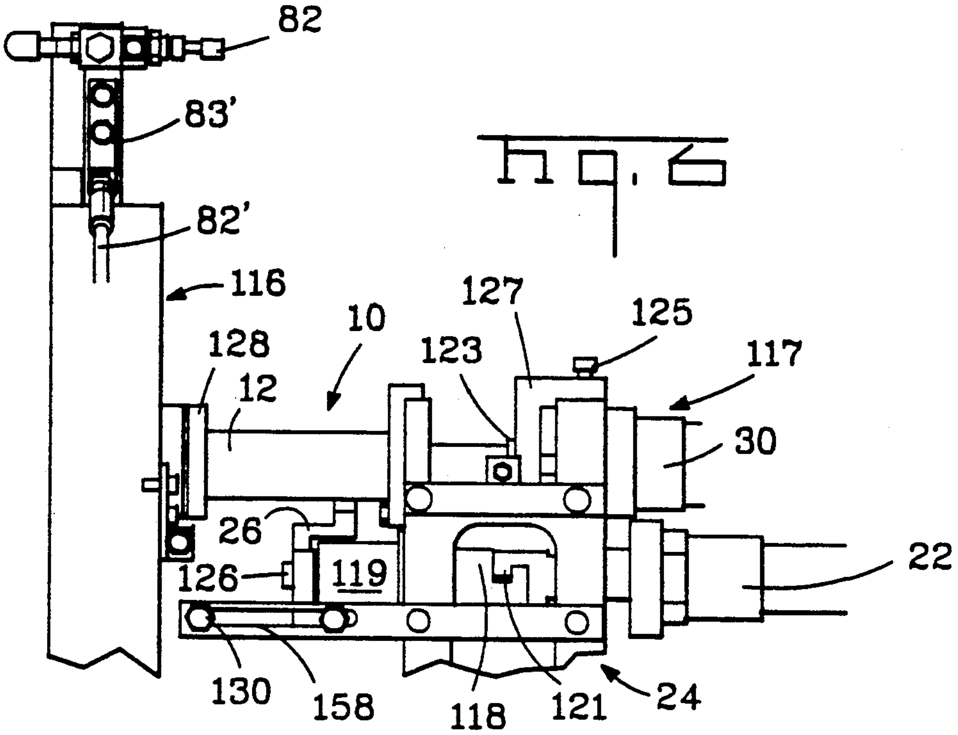
Fig. 6
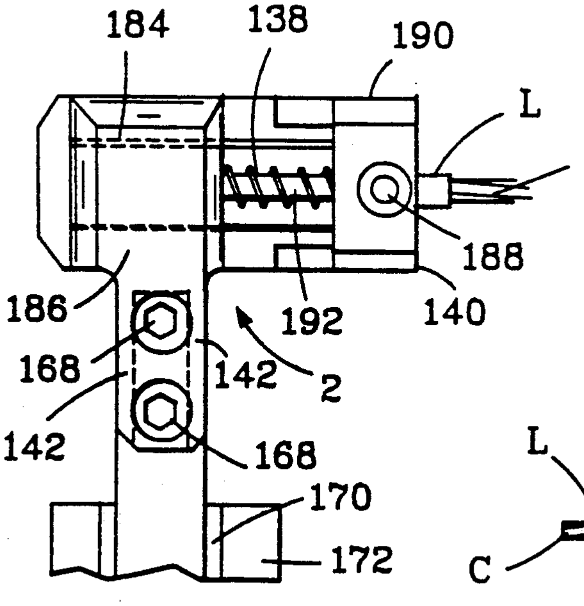
Fig. 7
Fig. 8
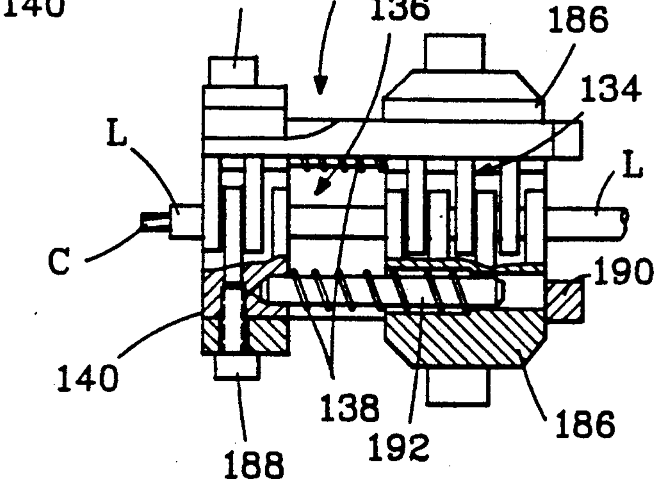

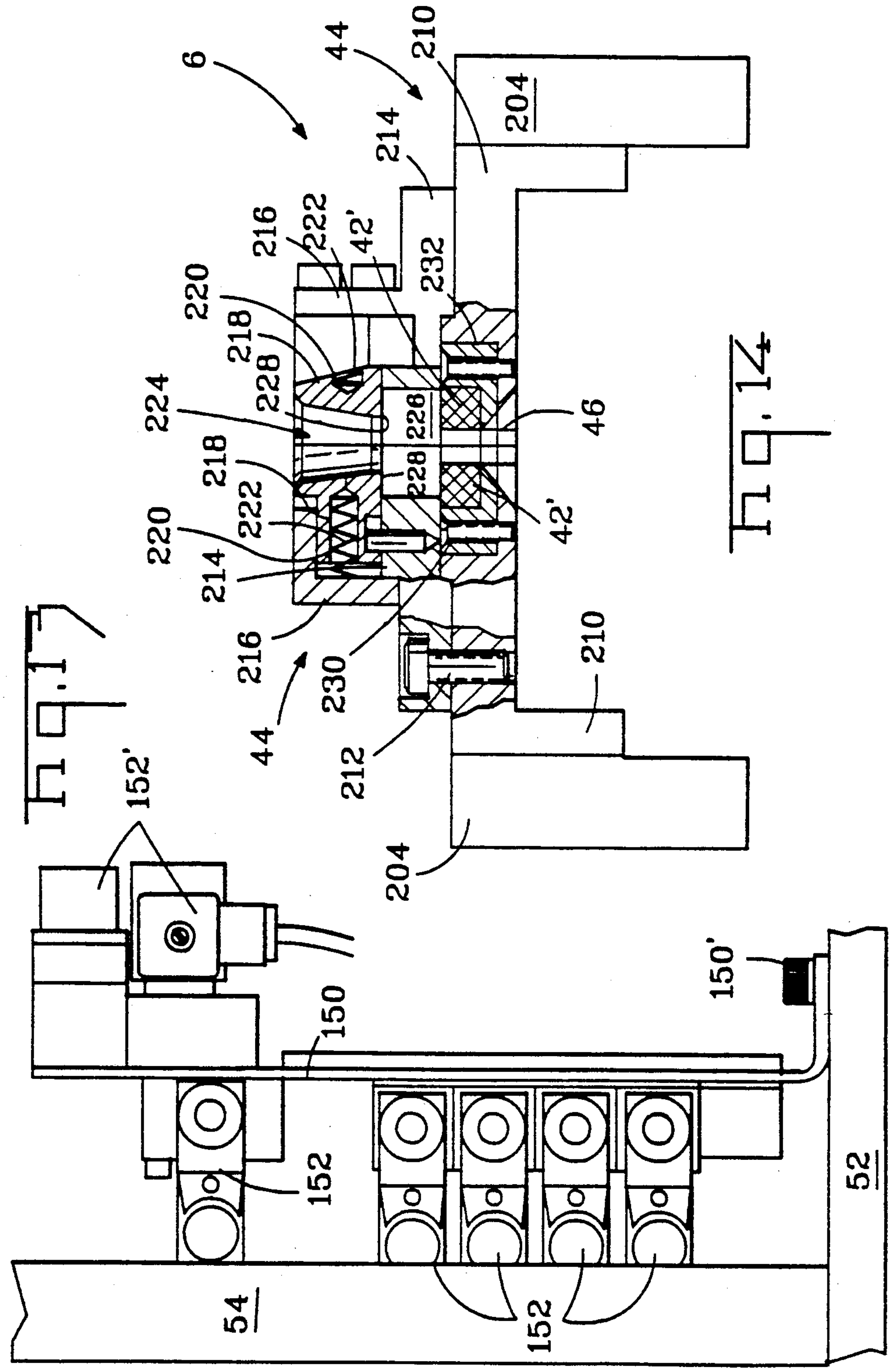
6
44
210
204
214
216
222
42'
232
220
218
228
224
226
46
230
212
152'
150
150'
152
52
54

APPARATUS FOR APPLYING A BUNG SEAL TO AN ELECTRICAL LEAD

FIELD OF THE INVENTION

This invention relates to apparatus for, and a method of, applying a hollow bung seal to an electrical lead.

BACKGROUND OF THE INVENTION

There is an increasing demand in the automotive industry for sealed electrical connectors. To this end, it is customary to seal the terminal receiving cavities of an insulating electrical connector housing by fitting the end of each lead to which an electrical terminal for insertion into a respective cavity is to be crimped, with a hollow bung seal.

Since such bung seals are made of an elastomeric material and since they must fit tightly about the leads, it is both tedious and time consuming for the lead ends to be inserted through the bung seals manually.

There is described in Japanese patent application No 58-026353, filed on Feb. 21, 1983, apparatus for applying a hollow bung seal to an electrical lead, the apparatus comprising; a bung seal source; a bung seal receptacle for receiving a leading bung seal from the bung seal source; a bung seal transfer device comprising a guide structure supporting, for axial movement relative thereto, a bung seal expansion sleeve and a bung seal expansion pin within said sleeve; means for inserting an electrical lead into the sleeve; and drive means for sequentially causing; the expansion pin to enter and expand a bung seal in the bung seal receptacle; the sleeve to enter and further expand the bung seal; the expansion pin to be withdrawn from the bung seal leaving it secured to the sleeve by its own resilience and permitting a lead to be inserted into the sleeve by the lead insertion means; and the sleeve to be withdrawn from the bung seal leaving it secured to the lead by its own resilience.

In this known apparatus, the bung seal transfer device is mounted on a turntable and is swung between a position opposite to a bung seal receptacle previously driven through a reciprocating movement to pick up the leading bung seal from the bung seal source, the bung seal transfer device with the bung seal on the expansion sleeve thereof then being swung by the turntable to a position opposite to the lead insertion means which is displaced by some ninety degrees about the axis of rotation of the turntable, from the bung seal receptacle.

SUMMARY OF THE INVENTION

The present invention is intended to provide a straight action apparatus of the above kind in which the turntable is accordingly eliminated.

According to one aspect of the present invention, therefore, apparatus as defined in the fourth paragraph of this specification, for applying a hollow bung seal to an electrical lead, is characterized in that the guide structure, the seal receptacle and the bung seal source are mounted in mutually fixed relationship. A bung seal transfer clamp is provided for withdrawing the leading bung seal from the bung seal source and placing it between the bung seal receptacle and the expansion pin, such that the bung seal can be transferred to the bung seal receptacle. The lead insertion means is mounted remote from the support structure, and is movable towards and away from the side of the bung seal receptacle.

The need for mounting the bung seal transfer device comprising the guide structure and the bung seal expansion sleeve and expansion pin, on a turntable in order to enable the seal applying operation to be carried out, is accordingly avoided.

The apparatus is especially intended for use as part of a harness making assembly comprising a lead making machine for supplying leads to the lead insertion means and for removing the leads with the seals thereon from the lead insertion means and transporting them to a crimping station at which electrical terminals are crimped thereto.

In order to minimize, and to simplify, the movement of the bung seal transfer clamp, the bung seal source may have a bung seal outlet which is positioned proximate to the guide structure and the seal receptacle, seal gripping jaws of the seal clamp being moveable rectilinearly, between the guide structure and the seal receptacle, between a first position to close about the leading seal at the seal outlet and a second position to align the leading seal with the expansion pin and the seal receptacle.

For ready extraction of the leading bung seal from the bung seal source, the bung seal source may comprise a magazine containing a column of bung seals, an end portion of the leading seal of the column being supported by a resiliently mounted escapement plate, the jaws of the seal clamp serving to grip the leading seal at a position back from said end portion in the first position of the seal clamp and to remove the leading seal from the magazine, against the resilient action of the escapement plate as the seal clamp is moved towards its second position.

In the known apparatus, a separate, resilient seal stop is used against which the seal is driven by the expansion pin. Since such a stop would, if used in the present apparatus, obstruct the insertion of the lead to the expansion sleeve, the seal receptacle may contain a grommet through which the leading end of the expansion pin, and the lead can be passed, and which serves as an abutment against which the leading end of the seal is forced by the expansion pin, as it transfers the seal from the bung seal clamp into the bung seal receptacle. In order to facilitate entry of the seal into the seal receptacle, it may be provided with an enlarged mouth and spring loaded detent means for preventing the seal from backing out from the seal receptacle as the sleeve is withdrawn from the bung seal.

In the interest of simplifying the drive means of the expansion pin and the expansion sleeve, as compared with the known apparatus, the support structure comprises a support sleeve fixed to a cylinder block on a base plate of the apparatus, in which sleeve the expansion sleeve and the expansion pin are slideably mounted, the expansion pin being driven by a first piston and cylinder unit fixed to the cylinder block in axial alignment with the support sleeve and the expansion sleeve being driven by a second piston and cylinder unit fixed in said block parallel with the first piston and cylinder unit. In this way the use of a complex linkage system for connecting the piston and cylinder units to the sleeve and the pin is rendered unnecessary. The second piston and cylinder unit may have its piston rod connected to a lug received in a notch in the expansion sleeve and which is moveable along an axial slot in the support sleeve.

For inserting a sufficient length of the lead into the expansion sleeve, the lead insertion means may comprise a lead clamp having lead gripping jaws and lead centering jaws, and a drive unit for moving the lead clamp towards and away from the bung seal receptacle, the centering jaws being movable towards the gripping jaws against the action of resilient means, for the purpose of advancing the lead into the bung seal receptacle upon the lead clamp being urged thereagainst by its drive unit.

If the lead clamp were to be advanced towards the seal receptacle with the lead projecting by said sufficient extent, the lead would tend to droop in front of the lead clamp so as to inhibit its insertion into the lead receptacle.

According to another aspect of the invention, a method of applying a hollow bung seal to an electrical lead, which method comprises the steps of placing the bung seal in a bung seal receptacle; expanding the bung seal by inserting a first bung seal expansion member therethrough; further expanding the bung seal by inserting a second bung seal expansion member surrounding the first expansion member, between the first expansion member and the seal; withdrawing the first expansion member, leaving the seal secured by its own resilience to the second expansion member; inserting the lead into the second expansion member; and withdrawing the second expansion member, leaving the seal secured about the lead by its own resilience and removing the lead with the bung seal thereon, from the bung seal receptacle; characterized in that the seal is placed in the bung seal receptacle and the lead is inserted thereinto with the bung seal receptacle, the first and second expansion members, and the lead all in axial alignment.

BRIEF DESCRIPTION OF THE DRAWINGS

For a better understanding of the invention and to show how it may be carried into effect, reference will now be made by way of example to the accompanying drawings which are partly schematic or diagrammatic and in which;

FIG. 1 is a side view, shown partly in section and with parts omitted, of apparatus for applying a hollow bung seal to an electrical lead;

Figure 7:
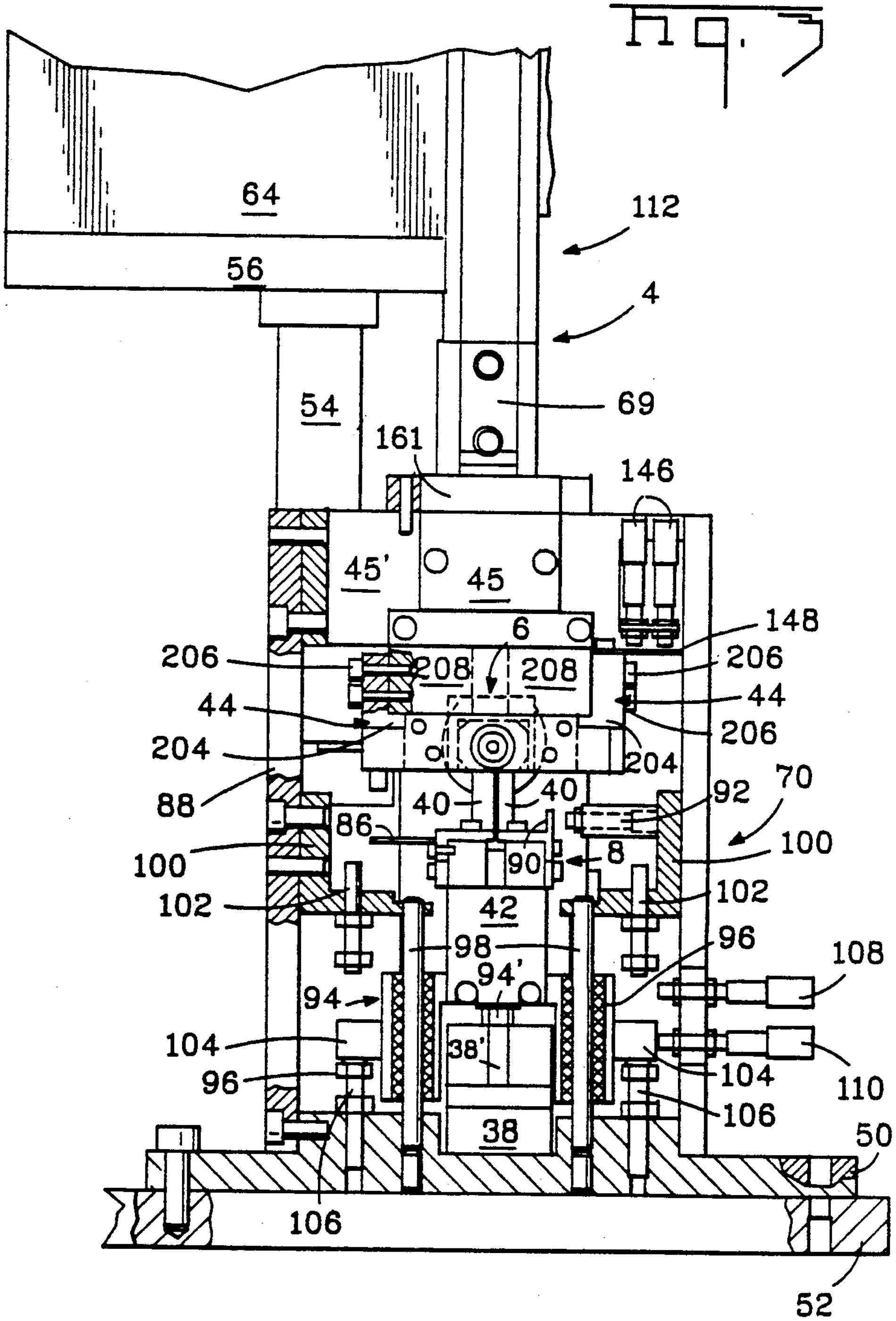
Figure 4:
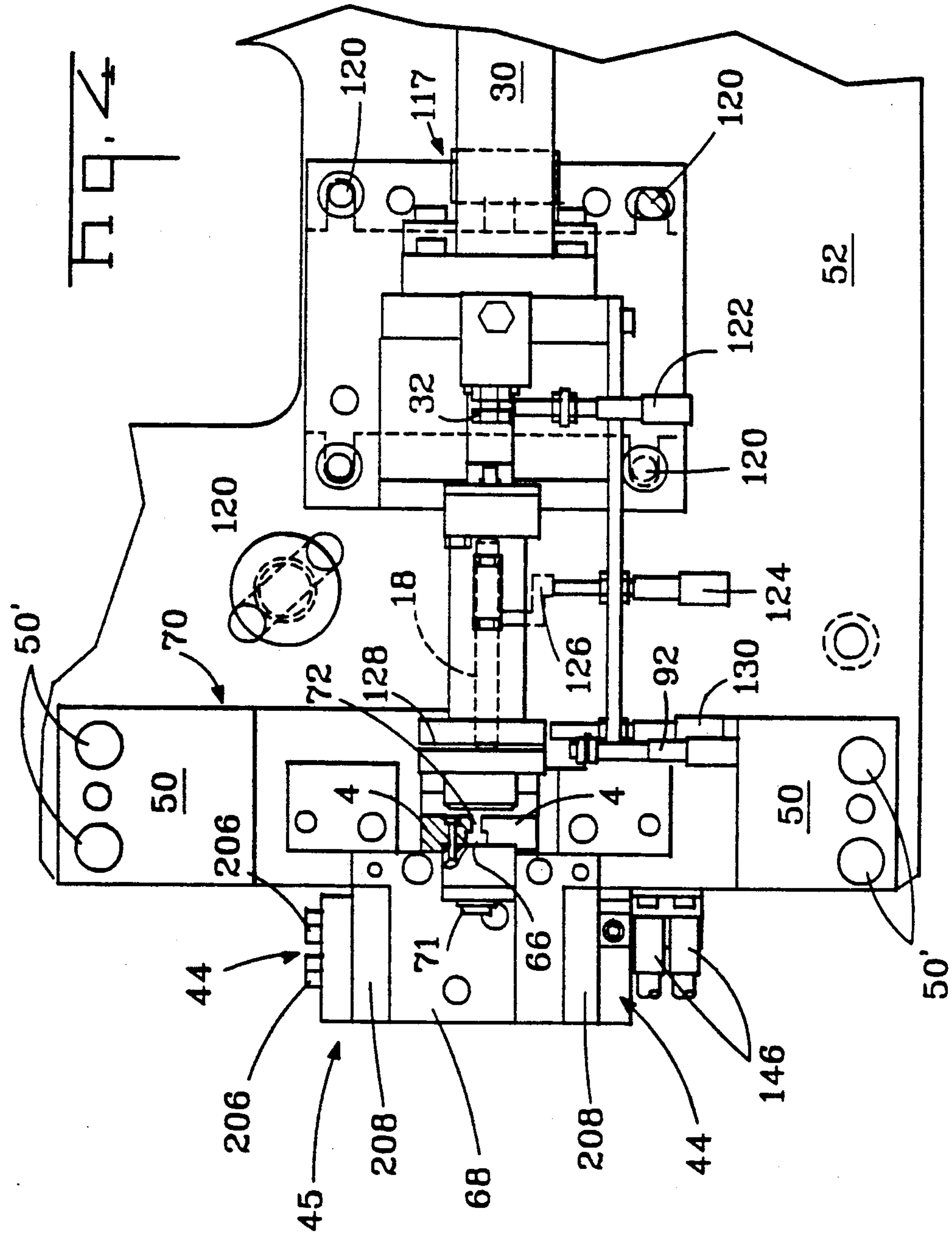
Figure 5:
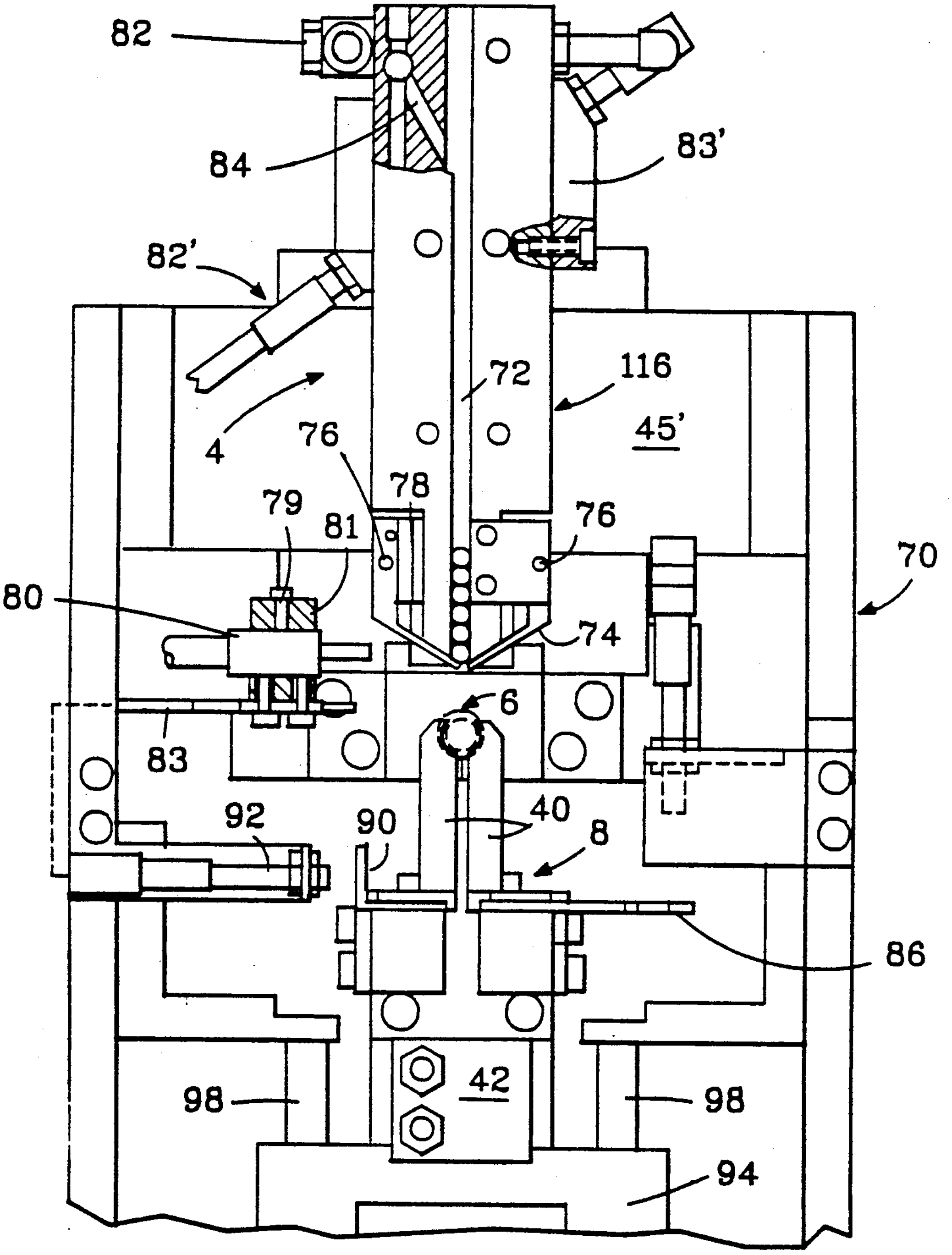
Figure 9:
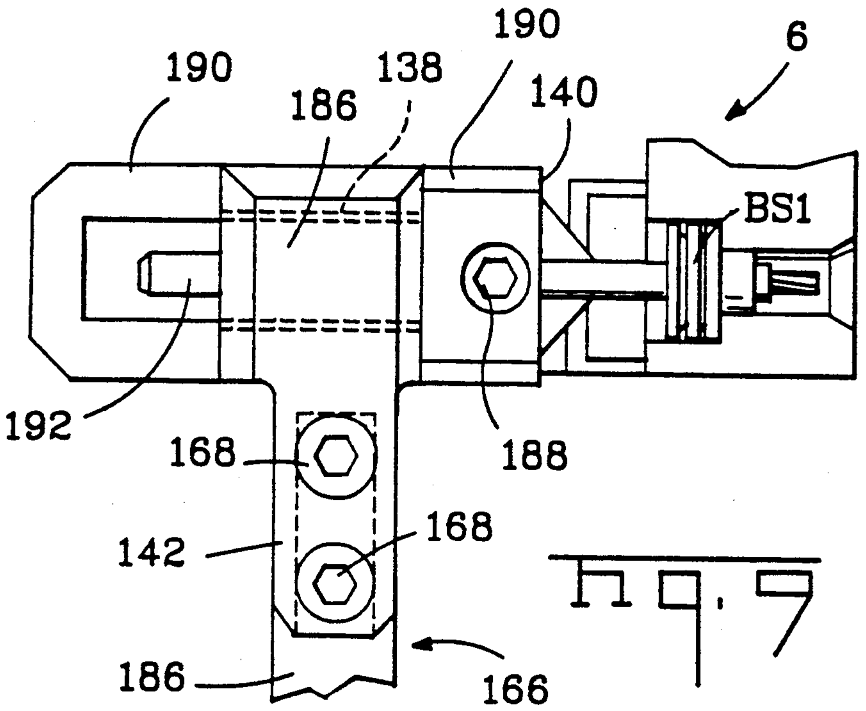
Figure 10:
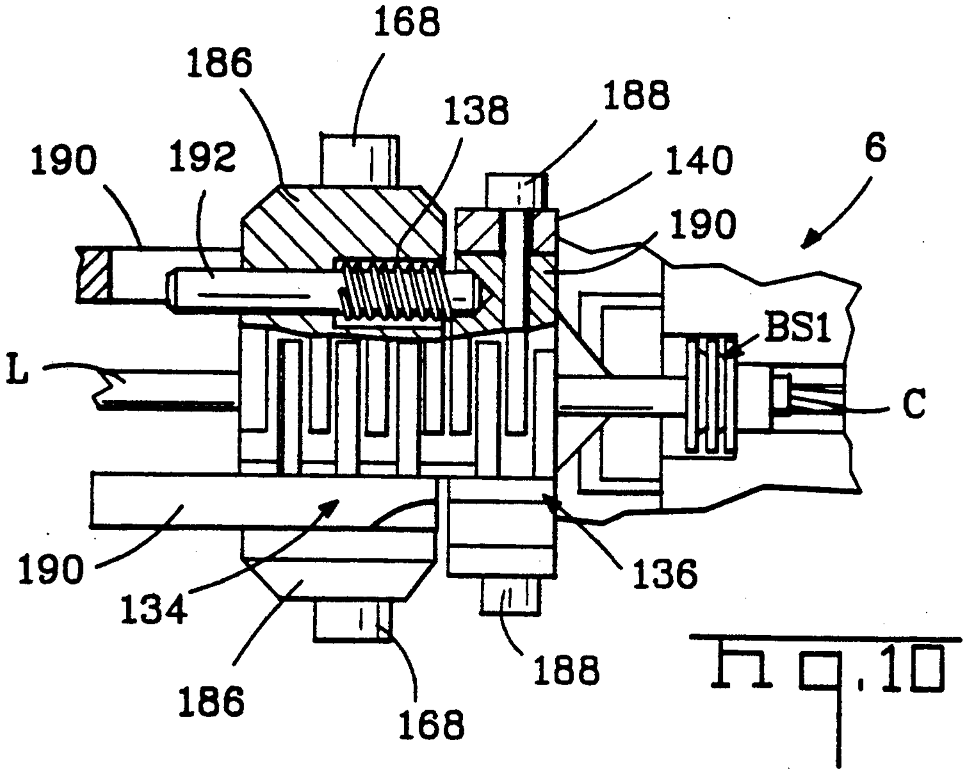
Figure 11:
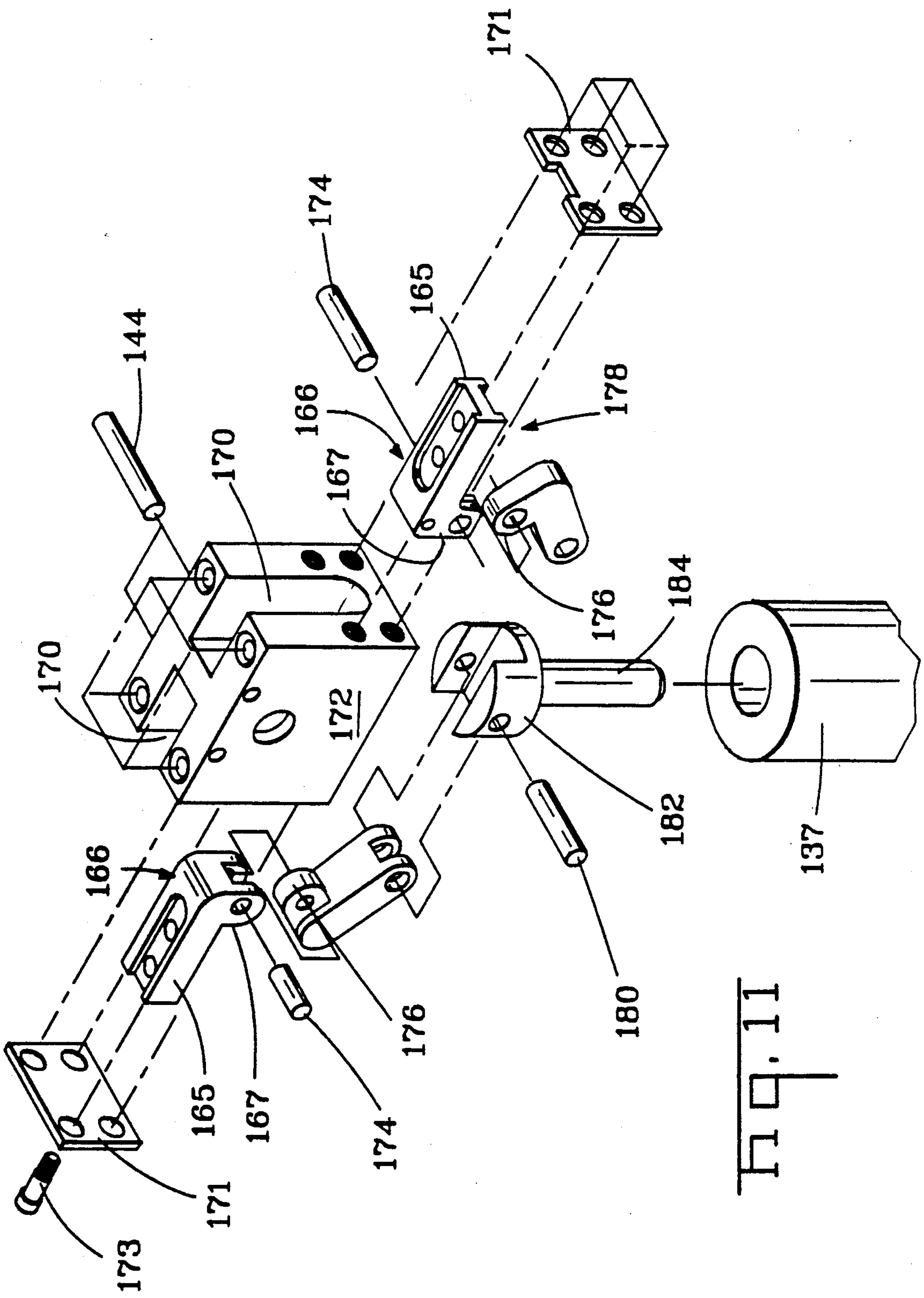
Figure 12:
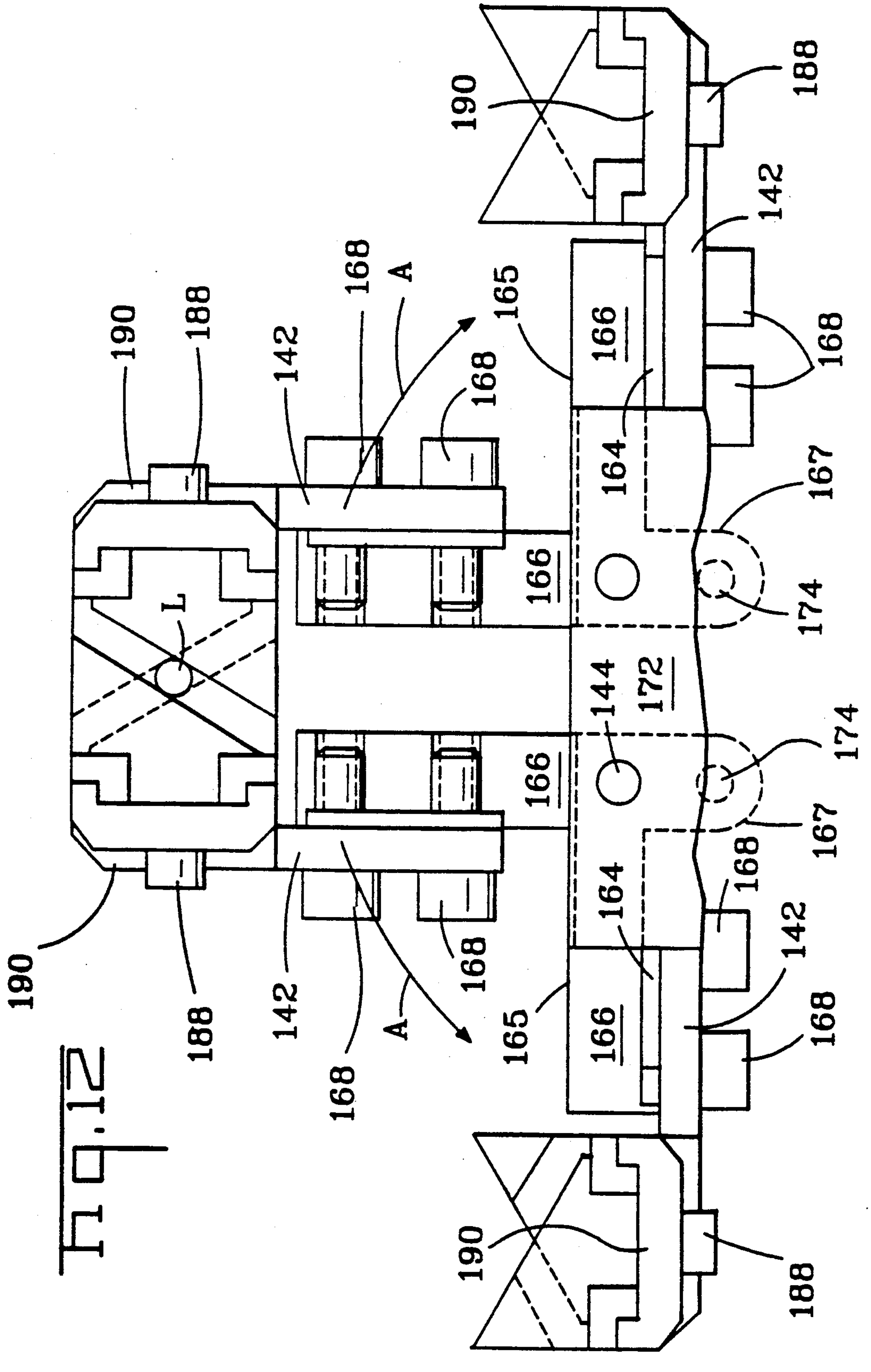

FIGS. *2a* to *2g* are diagrammatic, fragmentary, longitudinal sectional views illustrating successive stages in the operation of the apparatus;

FIG. *2h* is an enlarged side view of a bung seal which has been applied to an electrical lead and shows an electrical terminal crimped to the bung seal and to the lead;

FIG. 3 is a front view of the apparatus shown partly in section, and with parts omitted;

FIG. 4 is a fragmentary top plan view of the apparatus with parts omitted;

FIG. 5 is an enlarged, fragmentary view shown partly in section, taken in the direction of the arrow X in FIG. 1;

FIG. 6 is a fragmentary side view of FIG. 5;

FIG. 7 is an enlarged, side view of a lead clamp of the apparatus, showing the lead clamp in an expanded, normal condition;

FIG. 8 is a top plan view of FIG. 7, shown partly in section;

FIG. 9 is an enlarged side view of the lead clamp in a contracted condition, in abutment with a seal receptacle of the apparatus, which is shown diagrammatically;

FIG. 10 is a top plan view of FIG. 9, shown partly in section;

FIG. 11 is an exploded, isometric view illustrating a drive mechanism for the lead clamp;

FIG. 12 is a front view of the lead clamp illustrating both open and closed position thereof;

FIG. 13 is an end view of a control valve support plate of the apparatus; and FIG. 14 is an elevational view, partly in section, of a bung seal receptacle of the apparatus;

DETAILED DESCRIPTION OF THE INVENTION

The main working parts of the apparatus for applying a hollow bung seal to an electrical lead will now be described in outline with reference to FIG. 1. These main parts comprise a clamp 2 for an electrical lead L, a fixed bung seal magazine 4, a fixed bung seal receptacle 6, a bung seal transfer clamp 8, and a bung seal transfer device 10. The device 10 comprises a support structure in the form of a fixed outer sleeve 12, slideably supporting therein a bung seal expansion, inner sleeve 14 having a reduced cross-section, tapered nose 16, and which, in turn, slideably receives a bung seal expansion pin 18 having a tapered bung seal expansion nose 20 formed with a reduced cross-section guide end portion 21. The sleeve 14 is arranged to be driven axially relative to the sleeve 12 by the piston rod 24 of a pneumatic piston and cylinder unit 22, a lug 26 on the rod 24 engaging in a notch 28 in the sleeve 14 and in a longitudinal slot 29 in the outer sleeve 12. The pin 18 is driven axially relative to the sleeves 12 and 14 by means of a pneumatic piston and cylinder unit 30 by way of its piston rod 32, a lug 34 projecting rearwardly from the pin 18 engaging in a notch 36 in the piston rod 32. The bung seal transfer clamp 8 is driven in vertical reciprocating motion by means of a pneumatic drive piston and cylinder unit 38, jaws 40 of the clamp 8 being opened and closed by means of a pneumatic piston and cylinder unit 42 by way of a linkage (not shown). The lead clamp 2 which can be opened and closed by means described in detail below, is arranged to be driven towards and away from the receptacle 6, by means of a pneumatic piston and cylinder unit 43 under the control of a lead making machine, for example a Komax K42 machine. Jaws 44 of the seal receptacle 6 are arranged to be opened and closed by means of a pneumatic clamp unit 45 secured to a support plate 45'.

Figure 2A:
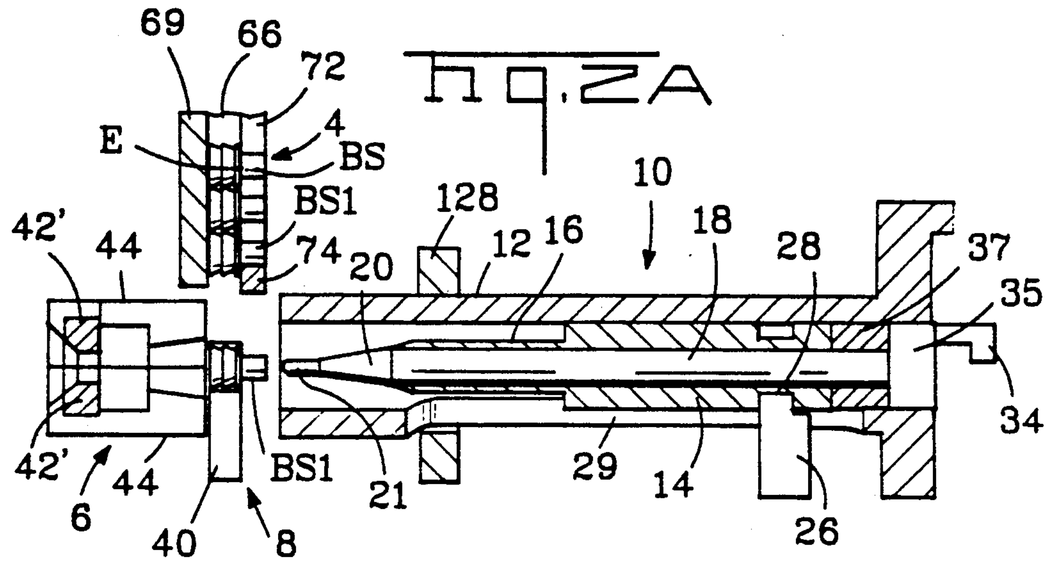
Figure 2B:
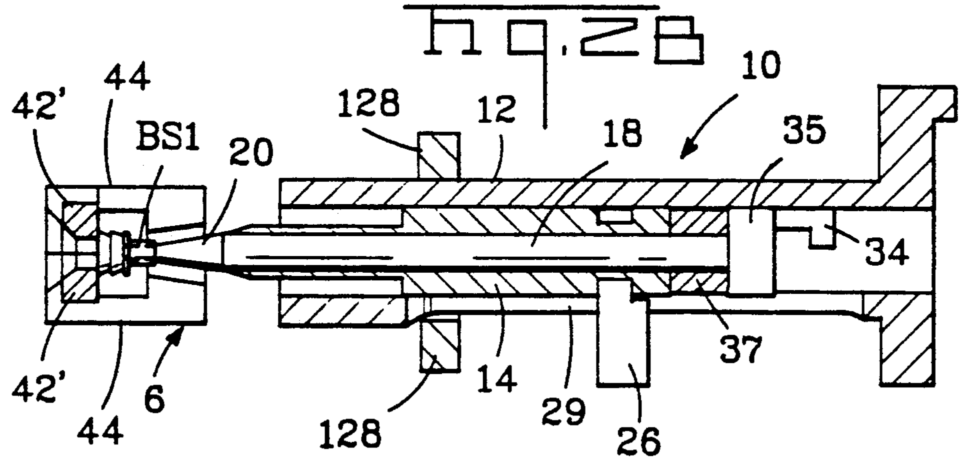
Figure 2C:
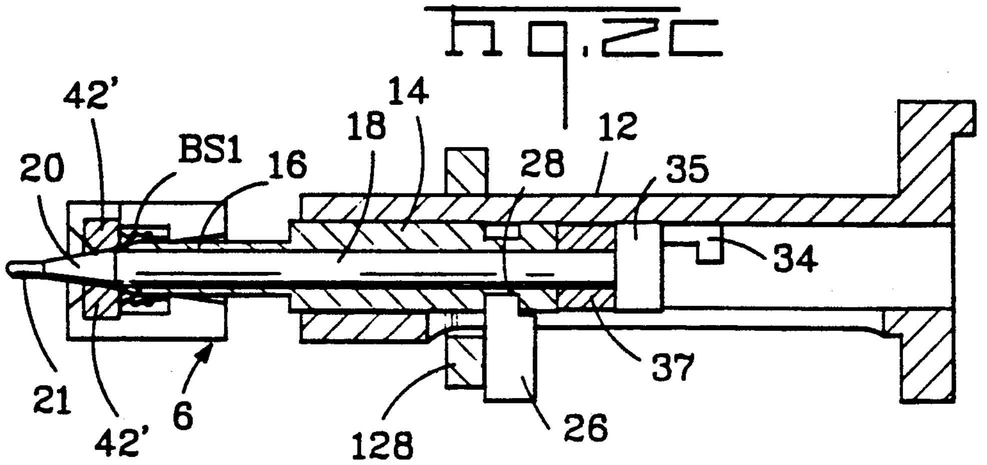
Figure 2D:
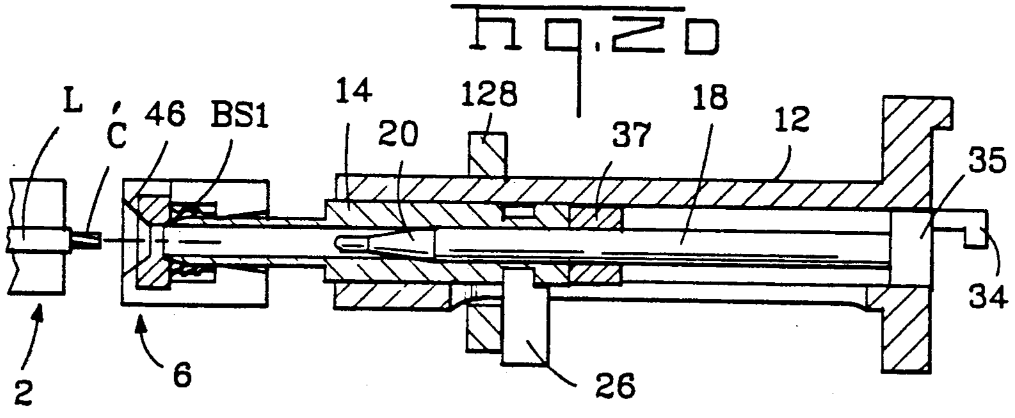
Figure 2E:
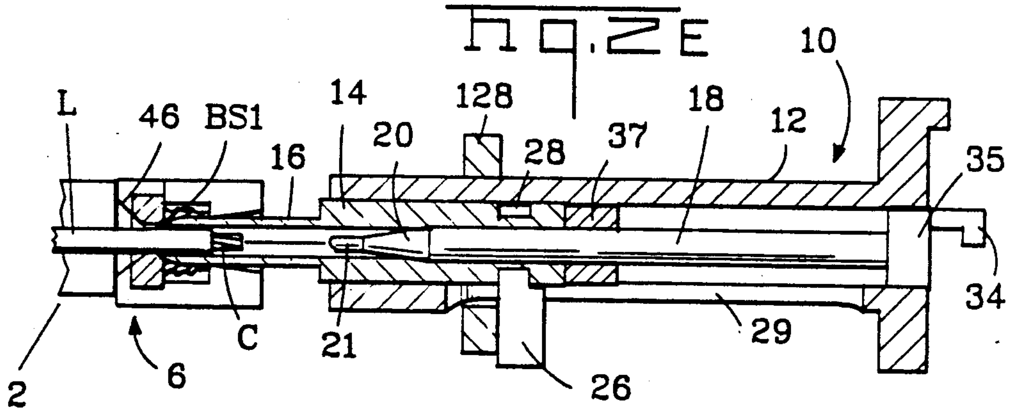
Figure 2F:
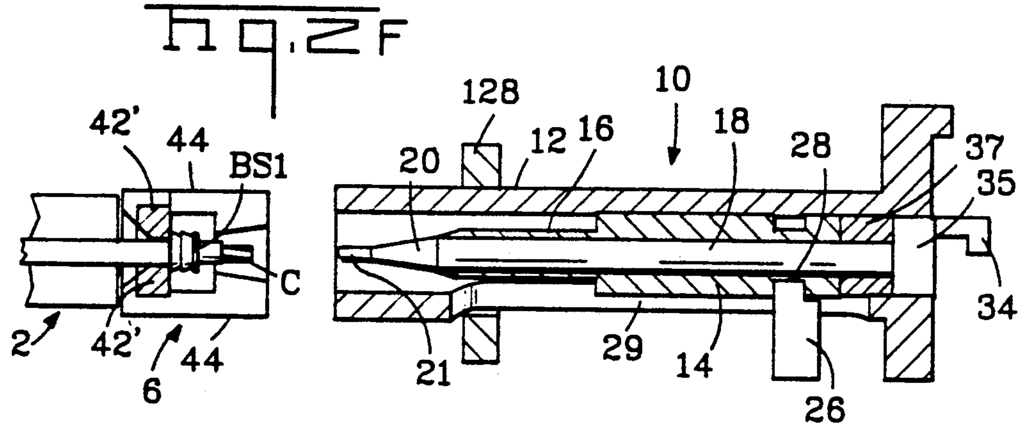
Figure 2G:
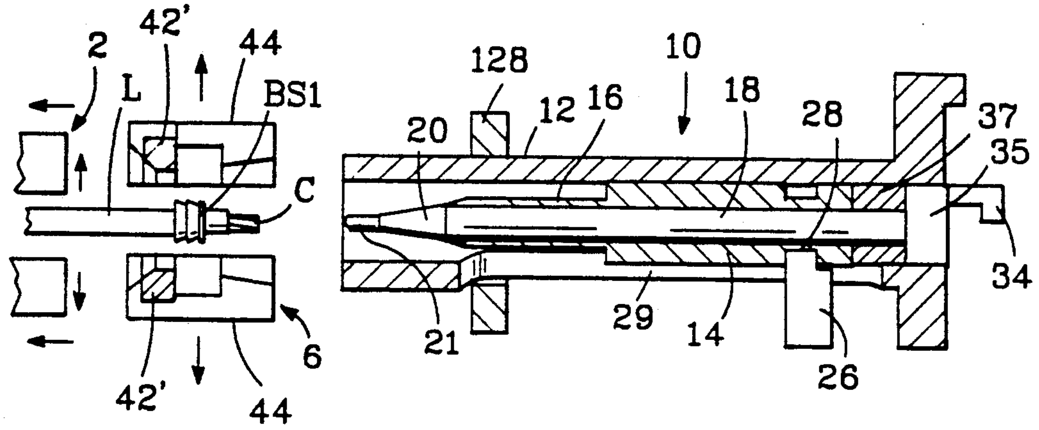
Figure 2H:
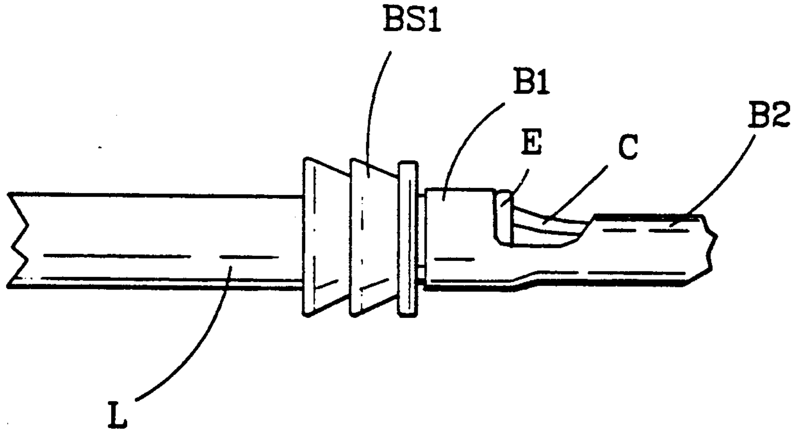

The operation of the apparatus will now be described in outline with reference to FIGS. *2a* to *2g*. As shown in FIG. *2a,* the magazine 4 contains a column of hollow bung seals BS made of an elastomeric material which have been fed into the magazine 4 by means described below. At the beginning of a cycle of the apparatus, the lead clamp 2 which has been closed about a lead L is in a retracted position shown in FIGS. 1 and *2d,* remote from the bung seal receptacle 6, the sleeve 14 and the pin 18 each being in a retracted position as shown in FIGS. 1 and *2a.* During a previous cycle of operation of the apparatus, the seal clamp 8 was raised rectilinearly by the unit 38 with its jaws 40 in an open position to receive between them the leading bung seal BS1 in the magazine 4 and the jaws 40 were then closed thereabout by the unit 42 and the clamp 8 was lowered by the unit 38, to place the seal BS1 in axial alignment with the pin 18 and with the seal receptacle 6, as shown in FIG. *2a.* Upon actuation of the apparatus by a parent machine, in the present example said lead making machine, as described below, the sleeve 14 and the pin 18 are advanced by their respective drive units 22 and 30, in unison, so that the nose 20 of the pin 18 enters the seal BS1, the end portion 21 of the nose 20 acting as a guide, at which time, the jaws 40 of the seal transfer clamp 8 are opened by the unit 42 and the nose 20 pushes the seal BS1 into the seal receptacle 6 as shown in FIG. 2*b*, so that the leading end of the seal BS1 butts against a pair of resilient half grommets 42' in the respective jaws 44 of the seal receptacle 6, which are in a closed position as shown in FIG. 2*b*. The sleeve 14 and the pin 18 are further advanced, in unison, by their drive units, so that, as shown in FIG. 2*c*, the seal BS1 is radially expanded by the tapered nose 20 of the pin 18 thereby allowing the tapered nose 16 of the sleeve 14 to enter the seal BS1 so as further to expand it, and so as to extend slightly beyond its leading end, the nose 20 of the pin 18 passing through the half grommets 42' to extend beyond the seal receptacle 6, as shown in FIG. 2*c*. As will be apparent from that Figure, the tapered noses 16 and 20, serve progressively to expand the seal BS1, so that is secured to the noses 16, by its own resilience so as to tightly grip it. As shown in FIG. 2*d*, the pin 18 is then retracted by its drive unit 30, relative to the sleeve 14, which remains stationary with the seal BS1 secured thereto. The lead clamp 2 carrying the lead L, the end part of the electrically conducted core, of which has been stripped of insulation by the parent machine, is then advanced as shown in FIG. 2*e*, so as to butt against the seal receptacle 6 to insert the end portion of the lead L into the receptacle 6 by way of a flared guiding mouth 46 thereof, and thus into the nose 16 of the sleeve 14, which is surrounded by the seal BS1. By reason of its abutment against the receptacle 6, the lead clamp 2 is compressed, as explained in detail below, so that the lead L is advanced relative to the lead clamp 2 as shown in FIG. 2*e*, to achieve full penetration of the lead L through the seal BS1. The lead clamp 2 is arranged to advance the lead L in this way, since if the lead L were to be carried by the clamp 2, in its advanced position, it would tend to droop in front of the clamp 2 so that the lead end would not be correctly inserted into the receptacle 6 and the sleeve 14. The sleeve 14 is now retracted by its drive unit to its starting position, as shown in FIG. 2*f*, the pin 18 also being in its starting position, thereby to withdraw the nose 16 of the sleeve 14 from the seal BS1 so that the latter resiles tightly to grip the insulation of the lead L in a position just back from the stripped end of the core C as shown in FIG. 2*f*. As shown in FIG. 2*g*, the receptacle 6 (shown as seen from above) and the lead clamp 2 (also shown as seen from above) are opened, so that the lead L within the seal BS1 resiliently secured thereto can be removed from the apparatus, and the lead clamp 2 is returned to its starting position and the jaws 44 of the receptacle 6 are closed by the unit 45, so that when the clamp 8 has seized a further seal from the magazine 4 in the manner described above, the parts of the apparatus are in a starting position ready for the next cycle of the operation thereof. The parent machine transfers the lead L with the seal BS1 thereon, to a crimping station not shown where an insulation barrel B1 of an electrical terminal is crimped about the end portion E of the seal BS1, a crimping barrel B2 of the terminal being crimped about the stripped end of the core C as shown in FIG. 2*h*.

The lug 34 of the pin 18 projects from a stop collar 35 thereon for engaging a stop 37 on the sleeve 14, when the sleeve 14 and the stop 37 are in their FIGS. 2*f* and 2*g* positions.

The apparatus and its operation will now be described in more detail, with particular reference to FIGS. 1 and 3 to 12. The apparatus comprises a base plate 52 for mounting on a work table (not shown) and having secured thereto columns 54 supporting a platform 56, which in turn supports a mounting plate 58 carrying pneumatic manifolds 60 (one of which is shown), a vibratory bowl bung seal feeder 64 and a bracket 62 supporting the upper end of the magazine 4 which is connected to the bowl feeder 64 to receive bung seals down a track 66 of the magazine 4. The magazine 4 is bolted to a bracket 68 and to the forward plate 69 of a forward frame 70 on a base plate 50 by means of bolts 71, the plate so being secured to the plate 52 by means of screws 50'. FIG. 3 shows the plate 69 with the bracket 68 removed As best seen in FIGS. 2*a* and 5, the track 66 opens on one side thereof into a slot 72 which is coextensive with the track 66 and is of smaller width than the track 66 and which receives the portions E of the seals BS, which are of reduced cross-section. The bottom of the track 66, as shown in FIG. 2*a*, is open, the bottom of the slot 72, being normally closed by a pair of escapement plates 74 which are mounted to the magazine 4 by means of pivot pins 76 and are urged by springs 78 (one of which is shown in FIG. 5) towards a position to close the bottom of the slot 72. The presence of a seal against the escapement plates 74 is monitored by means of an opto-electric sensor 80 adjustably secured in a block 81 by means of screws 79, the block 81 being secured to a vertically adjustable vane 83 on the frame 70. An adjustable pneumatic valve 82 causes compressed air to be continuously applied by way of a conduit 84 extending obliquely into the track 66, against the column of bung seals BS therein, thereby to urge the leading seal BS1 against the escapement plates 74, so that its jaws 40 of the seal clamp 8 can close about the leading seal BS1 at a position back from its end E, given that the bottom of the track 66 is open as mentioned above. An opto-electric sensor 82' on a support 83' detects the height of the column of seals BS in the track 66. As the seal clamp 8 is lowered towards the end position in which it is shown in FIG. 2*a*, with the jaws 40 thereof closed about the leading seal BS1, the escapement plates 74 are forced, against the action of the springs 78, to open the bottom of slot 72 to allow the seal BS1 to escape from the magazine 4. A vane 86 on the seal clamp 8 cooperates with a sensor 88 on the frame 70 to detect the raised position of the seal clamp 8, a further vane 90 on the clamp 8 cooperating with a sensor 92 to detect the open position of the jaws 40. The clamp 8 is secured to a slide 94 having bushings 96, FIG. 3, running on rods 98 secured at their lower ends in the base plate 50 and at their upper ends in brackets 100 fixed to the frame 70. As best seen in FIG. 1, the piston rod 38' of the unit 38 is connected to the slide 94 by means of a coupling 94'. Adjustable stops 102 on the brackets 100 and adjustable stops 106 on the plate 50 cooperate to define the limits of the upper and lower positions of the seal clamp 8. The raised and lowered positions of the slide 94 are monitored by sensors 108 and 110, respectively, on the frame 70. The magazine 4 has an upper part 112 secured by bolts 114 to a vertical lower part 116 thereof fixed to the bracket 68.

The pneumatic clamp unit 45 of the seal receptacle 6 is mounted to the forward side of the frame 70. The units 30 and 22 and the seal transfer device 10 are supported by a cylinder block 117 secured to the base plate 52 by means of bolts 120 (FIGS. 1, 4 and 6). The piston rod 24 comprises a slide 118 in a slide housing 119 connected to the unit 22 by means of a coupling 121, the lug 26 being fixed to the leading end of the slide 118 by means of a screw 121. The retracted position of the piston rod 32 and thus of the pin 18 is determinable by means adjustment stops 123 and 125 in an L-block 127, the piston rod 32 having a pad 129 (FIG. 1) cooperating therewith. On the block 117 is a sensor 122 (FIG. 4) for sensing the retracted position of the piston rod 32 of the piston and cylinder unit 30 and thus of the pin 18. A sensor 124 cooperates with a vane 126 fixed to the lug 26 to sense the retracted position of the sleeve 14, as shown in FIG. 4. The forward end position of the lug 26 and thus that of the sleeve 14, is limited by an adjustable stop 128 on the sleeve 12. The advanced position of the sleeve 14 is sensed by a sensor 130 on the frame 70.

The lead clamp 2 will now be described in outline with reference to FIGS. 1 and 7 to 12. The lead clamp 2 comprises a set of seven lead gripping jaws 134 and a set of four lead centering jaws 136. These sets of jaws can be opened and closed simultaneously by means of a pneumatic piston and cylinder drive unit 137 in a lead clamp support 138 on a carriage 139, on which lead clamp 2 is mounted in front of the apparatus. The jaws 136 do not serve to grip the lead L, which is slideable therebetween even when the jaws 136 are in a closed position. There can be some play between the jaws 136 and the lead L since the centering of the lead L need not be precise in view of the provision of the guiding, mouth 46 of the receptacle 6 and the fact that the bore of the sleeve 14 is somewhat oversized with respect to the gauge of the lead L. The jaws 136 are mounted so as to be slideable towards the jaws 134 against the action of coil springs 138' when the leading end 140 of the lead clamp 2 butts against the seal gripper 6, so that the leading end of the lead L is advanced to its correct length in the receptacle 6 as described above with reference to FIG. 2e, the lead L sliding between the jaws 136 which, as mentioned above are centering, rather than gripping, jaws. The jaws 134 and 136 are mounted on respective support arms 142, which can be swung about the axes of pins 144, by means of the piston and cylinder unit 137, to move the jaws 134 and 136 between their open and their closed positions. The said work table can be raised and lowered to align the receptacle 6 with the lead clamp 2.

The lead clamp 2 and its operation will now be described in greater detail. FIGS. 7 and 8 show the lead clamp 2 in its normal uncompressed state, FIG. 2d, whereas FIGS. 9 and 10 show it in its compressed state, FIGS. 2e and 2f, whilst FIG. 12 shows the jaws both in their open and in their closed positions. The arms 142, each of which carries one array of jaws of each set of jaws 134 and 136, are each mounted to the longer leg 165 of an L-shaped swivel arm 166 by means of screws 168. Each swivel arm 166 is pivoted, as shown in FIG. 11, by means of one of the pins 144, at the junction between its legs 165 and 167, in a respective clevis 170 formed in a pivot block 172 as best seen in FIGS. 11 and 12. Each clevis 170 is partially closed by a swivel arm cover plate 171 secured to the block 172 by means of screws 173. The shorter leg 167 of each swivel arm 166 is pivoted by means of a pin 174 (FIG. 11) to a lug 176 at one end of a further swivel arm 178, the other end of which is pivoted by means of a pin 180 to a clevis 182 on a piston rod 184 of the piston and cylinder unit 137. Thus the jaws 134 and 136 are opened as indicated by the arrows A in FIG. 12, when the piston rod 184 is retracted and are closed when it is advanced. Each array of lead gripping jaws 134 is fixed to a cheek 186 on a respective support arm 142 of the clamp 2, each array of jaws of the lead centering jaws 136 being secured by means of a screw 188 to a slide 190, which is mounted for horizontal sliding movement in the respective cheek 186. The springs 138' against the action of which the jaws 136 are moved towards the jaws 134, when, as shown in FIGS. 9 and 10, the leading end 140 of the clamp 2 butts against the lead receptacle 6, are carried by rods 192 fixed in the slide 190 and which are slideable in the cheeks 186, as best seen in FIG. 10.

Vertical support plate 150 fixed by screws 150' to the base plate 52 carries arrays of pneumatic valves 152 (most of which are shown in FIG. 13) for the control of the servo devices described above for actuating the moveable parts of the apparatus, under the control of an electronic control circuit 154 mounted on the plate 52 and which supports an electronic control box 156 for the vibratory bowl feeder 64. The plate 150 also carries a pneumatic pressure control device 152'.

The spacing between the sensors 124 and 130 can be adjusted by means of a slide arrangement 158 (FIG. 6). The open and closed positions of the jaws 44 of the seal receptacle 6 are detected by sensors 146 in cooperation with a vane 148 on one of the jaws 44.

The sensors described above are all proximity switches excepting the opto-electrical sensors 80 and 82'. The sensor 80 serves to signal the control circuit 154 to stop further operation of the apparatus should no seal BS1 be present against the escapement plates 74. The sensor 82' serves to signal the control box 156 when the height of the column of seals in the track 66 falls below the beam level of the sensor 82', to start the bowl feeder 64. The sensor 122, which detects the retracted position of pin 18, signals the circuit 154 to step forward a counter 200 (FIG. 1) for counting the number of seals that have been applied to leads each time the pin 18 is returned to its retracted position. The sensors 146, which detect the open and the closed positions of the jaws 44 of the seal receptacle 6, signal the circuit 154 to initiate the next following step of the apparatus upon opening and closure, as the case may be, of the jaws 44. The sensor 124 serves to actuate the control circuit 154 to open the jaws 44 of the receptacle 6 when the sleeve 14 is retracted to its FIG. 2f position.

The lead making machine which comprises lead conveying jaws 162 (FIG. 1) is not otherwise shown in the drawings, the jaws 162 are moved by means of an endless conveyor chain in a direction perpendicular to the plane of FIG. 1. Operation of the bung seal applying apparatus is initiated by pressing a start button 202 of the control circuit 154. Initially, the jaws 134 and 136 of the lead clamp 2 are open under the control of the lead making machine. When the jaws 162 which carry a lead L are in alignment with the open jaws 134 and 136, the lead making machine closes the jaws 134 and 136 about the lead L. When the sleeve 14 is in its fully advanced FIG. 2d position, the sensor 130 is actuated to signal the control circuit 154 to advance the lead clamp 2 to its FIG. 2e fully advanced position, provided that the circuit 154 has received a signal from the lead making machine that the jaws 134 and 136 are, in fact, closed and that the jaws 162 have opened. When the jaws 44 of the lead receptacle 6 have been opened by the control circuit 154 upon the sensor 124 being actuated by the vane 126, the circuit 154 signals the lead making machine to retract the lead clamp 2, close the jaws 162 and open the jaws 134 and 136 of the lead clamp 2. The lead making machine then starts its conveyor to transfer the lead L to the crimping station. As the jaws 44 of the receptacle 6 open, they activate the sensors 146 to cause the control circuit 154 to recycle the seal applying apparatus upon receipt of a signal from the lead making machine that the lead clamp 2 has been fully retracted to its starting position. When the jaws 44 are thereby closed, the sensors 146 are actuated to cause the piston and cylinder unit 38 to be actuated by the circuit 154 to raise and lower the lead clamp 8 to position a further seal BS1 between the receptacle 6 and the transfer device 10.

The bung seal receptacle 6, which has so far been described only when in diagrammatic form, will now be described in more detail with particular reference to FIG. 14 and also with reference to FIGS. 1, 3 and 4. Each jaw 44 comprises an upright 204 secured by screws 206 to a respective slide block 208, the blocks 208 being driven horizontally towards and away from each other by the drive unit 45. Each upright 204 is fixed to an L-shaped support 210 to which is secured by screws 212 a jaw body member 214 to which is in turn secured an L-section slide housing 216 in which is contained, for horizontal sliding movement, a seal stop slide 218 formed with a blind bore 220 containing a spring 222, the springs 222 acting between the housings 216 and the slides 218 to urge the latter towards each other. In the closed position of the jaws 44, the slides 218 cooperate to define a flared seal entry mouth 224, the body members 214 cooperating to define a seal receiving opening 226. Each slide 218 has a seal abutment lip 228 at the seal entry end of the opening 226. Each support 210 has secured therein by screws 230 an insert containing the respective half grommet 42'. The seal BS1 entering the mouth 224 urges the slides 218 away from each other against the action of the springs 222 which cause the slides 218 to resile when the seal BS1 has entered the opening 226, so that the lips 228 close behind the seal ensuring that it cannot back out as the sleeve 14 is retracted from its FIG. 2*e* position to its FIG. 2*f* position. This feature enables the diameter of the mouth 224 to be enlarged for easy insertion of the seal.

If the seals BS are dark in color and so reflect little light, the opto-electrical sensor 80 may be mounted to the magazine itself, with the working end of the sensor 80 proximate to the leading seal BS1.

We claim:

1. Apparatus for applying a hollow bung seal to an electrical lead, the apparatus comprising; a bung seal source (4); a bung seal receptacle (6) for receiving a leading bung seal (BS1) from the bung seal source (4); a bung seal transfer device (10) comprising a guide structure (12) which supports for axial movement relative thereto, a bung seal expansion sleeve (14) and a bung seal expansion pin (18) within said sleeve (14); means (2) for inserting an electrical lead (L) into the sleeve (14); and drive means (22,30) for sequentially causing; the expansion pin (18) to enter and expand the bung seal (BS1) in the bung seal receptacle (6); the sleeve (14) to enter and further expand the bung seal (BS1); the expansion pin (18) to be withdrawn from the bung seal (BS1) leaving said bung seal secured to the sleeve (14) by its own resilience, and permitting a lead (L) to be inserted into the sleeve (14) by the lead insertion means (2); and the sleeve (14) to be withdrawn from the bung seal (BS1) leading said bung seal secured to the lead (L) by its own resilience; characterized in that the guide structure (12), the seal receptacle 6) and the bung seal source (4) are mounted in mutually fixed relationship, a bung seal transfer clamp (8) being provided for withdrawing the leading seal (BS1) from the bung seal source (4) and placing said leading seal between the bung seal receptacle (6) and the expansion pin (18) for transfer thereby into the bung seal receptacle (6), the lead insertion means (2) being mounted for movement towards and away from the side of the bung seal receptacle (6) remote from the guide structure (12), the seal receptacle having a pair of jaws 44) having an open and a closed position and containing resilient members (42') which, in the closed position of the jaws, co-operate to provide a grommet through which the leading end (20) of the expansion pin (18) and the lead (L) are passed, and which serves as an abutment against which an end of the seal (BS1) is forced by the expansion pin (18) after said expansion pin has transferred the seal (BS1) from the bung seal clamp (8) to the bung seal receptacle (6).

2. Apparatus according to claim 1, characterized in that the bung seal source (4) has a bung seal outlet (74) proximate to the guide structure (12) and the seal receptacle (6), and the bung seal clamp (8) has seal gripping jaws (40) moveable rectilinearly between the guide structure (12) and the seal receptacle (6), between a first position to close about the leading seal (BS1) at the seal outlet (74) and a second position to align the leading seal (BS1) with the expansion pin (18) and the seal receptacle (6).

3. Apparatus according to claim 2, characterized in that the seal source comprises a magazine (4) containing a column of bung seals (BS), an end portion of the leading seal (BS1) of the column being supported by a resiliently mounted escapement plate (74), the jaws (40) of the seal clamp (8) serving to grip the leading seal (BS1) at a position back from said end portion (E) in the first position of the seal clamp (8, and to remove the leading seal (BS1) from the magazine (4) against the resilient action of the escapement plate (74) as the seal clamp (8) is moved towards its second position.

4. Apparatus according to claim 3, characterized in that the magazine (4) defines a vertical track (66) one side of which opens into a slot (72) coextensive with the track (66) and of smaller width than the track (66) and which receives the end portions (E) of the seals (BS), the bottom end of the slot (72) being closed by said escapement plate (74) and the bottom end of the track (66) being open to receive the jaws (40) of the seal clamp (8).

5. Apparatus according to claim 4, characterized in that the seal receptacle (6) has a seal receiving mouth (224) defined in the closed position of the jaws (44) by a pair of spring loaded members (218) formed with lips (228) which face the resilient members (42') and which close behind the seal BS1 when it has been inserted into the seal receptacle through the mouth (224).

6. Apparatus according to any one of the preceding claims, characterized in that the guide structure comprises a support sleeve (12) fixed to a cylinder block (117) on a baseplate (52) of the apparatus in which the support sleeve (12), the expansion sleeve (14) and the expansion pin (18) are slideably mounted, the expansion pin (18) being driven by a first piston and cylinder unit (30) fixed to the block (117) in axial alignment with the support sleeve (12) and the expansion sleeve (14) being driven by a second piston and cylinder unit (22) fixed to the cylinder block (117) parallel with the first piston and cylinder unit (30).

7. Apparatus according to claim 6, characterized in that the second piston and cylinder unit (22) has a piston rod (24) which is connected to a lug (26). said lug (26) being received in a notch (28) in the expansion sleeve (14) and being moveable along an axial slot (29) in the support sleeve (12).

8. Apparatus according to claim 6 characterized in that the lead insertion means comprises a lead clamp (2) having lead gripping jaws (134) and lead centering jaws (136), means for opening and closing these jaws, and a drive unit (43) for moving the lead clamp (2) towards and away from the bung seal receptacle (6), the centering jaws (136) being movable towards the gripping jaws (134) against the action of resilient means (138), for the purpose of advancing the lead (L) into the bung seal receptacle (6), upon the lead clamp (2) being urged thereagainst by the drive unit (43).

9. Apparatus for applying a hollow bung seal to an electrical lead, the apparatus comprising; a bung seal source (4); a bung seal receptacle (6) for receiving a leading bung seal (BS1) from the bung seal source (4); a bung seal transfer device (10) comprising a guide structure (12) which supports for axial movement relative thereto, a bung seal expansion sleeve (14) and a bung seal expansion pin (18) within said sleeve (14); means (2) for inserting an electrical lead (L) into the sleeve (14); and drive means (22,30) for sequentially causing; the expansion pin (18) to enter the bung seal (BS1) in the bung seal receptor the sleeve to enter and the expansion pin (18) to be withdrawn from the bung seal (BS1) leaving said bung seal secured to the sleeve (14) by its own resilience, and permitting a lead (L) to be inserted into the sleeve (14) by the lead insertion means (2); and the sleeve (14) to be withdrawn from the bung seal (BS1) leaving said bung seal secured to the lead (L) by its own resilience; the seal receptacle (6) having a pair of jaws (44) having an open and a closed position and containing resilient members (42') which, in the closed position of the jaws, co-operate to provide a grommet through which the leading end (20) of the expansion pin (18) and the lead (L) are passed, and which serves as an abutment against which an end of the seal (BS1) is forced by the expansion pin (18) after said expansion pin has transferred the seal (BS1) from the bung seal clamp (8) to the bung seal receptacle (6).

* * * * *